United States Patent [19]

Canning

[11] 4,210,354
[45] Jul. 1, 1980

[54] AERODYNAMIC DRAG-REDUCING SHIELD FOR MOUNTING ON THE FRONT OF A CARGO CARRYING COMPARTMENT OF A ROAD VEHICLE

[76] Inventor: Robert B. Canning, 120 Widdicombe Hill Blvd., Apt. 708, Weston, 4A6

[21] Appl. No.: 875,202

[22] Filed: Feb. 6, 1978

[51] Int. Cl.² ............................................. B62D 35/00
[52] U.S. Cl. ..................................... 296/1 S; 105/2R; D12/181
[58] Field of Search .................. 296/1 S, 91; 105/2 R; D12/181

[56] References Cited

U.S. PATENT DOCUMENTS

| D. 245,246 | 8/1977 | Crowe | D12/181 |
|---|---|---|---|
| 1,648,505 | 11/1927 | Persu | 296/1 S |
| 2,514,695 | 7/1950 | Dempsey | 296/1 S |
| 3,241,876 | 3/1966 | Saunders | 296/1 S |
| 3,415,566 | 12/1968 | Kerrigan | 296/1 S |
| 3,425,740 | 2/1969 | De Vaughn | 296/1 S |
| 3,697,120 | 10/1972 | Saunders | 296/1 S |
| 3,814,472 | 6/1974 | Zelikovitz | 296/1 S |
| 4,021,069 | 5/1977 | Hersh | 296/1 S |
| 4,030,779 | 6/1977 | Johnson | 296/1S |

OTHER PUBLICATIONS

Hammitt, A. G. "The Aerodynamics of High Speed Ground Transportation" Western Periodicals Co., 1973, pp. 38–51.
Corr.,G. W. "The Aerodynamics of Basic Shapes for Road Vehicles Part 1, Simple Rectangular Bodies" MIRA Report No. 1968/2, Nov. 1967, pp. 5–7.
Sovran et al. "Aerodynamic Drag Mechanisms of Bluff Bodies and Road Vehicles" Plenum Press, 1978, p. 60.

*Primary Examiner*—John J. Love
*Assistant Examiner*—Ross Weaver
*Attorney, Agent, or Firm*—Ridout & Maybee

[57] ABSTRACT

An aerodynamic drag-reducing shield for mounting on the front of a trailer or truck box, has a front surface contour defined by a series of semi-ellipses, the minor axes of the ellipses tapering off towards the upper rear edge of the shield at such rate that in profile the shield has a part-elliptical leading edge.

8 Claims, 5 Drawing Figures

# AERODYNAMIC DRAG-REDUCING SHIELD FOR MOUNTING ON THE FRONT OF A CARGO CARRYING COMPARTMENT OF A ROAD VEHICLE

BACKGROUND OF THE INVENTION

This invention relates to an aerodynamic drag-reducing shield for mounting on the front of a cargo-carrying compartment of a road vehicle. More particularly, the invention relates to a shield having a novel and advantageous surface contour.

The inventor is aware that there have been various prior proposals for devices for reducing the aerodynamic drag that is caused by the interaction of an air stream with the vertical flat front surface of the cargo-carrying compartment of a road vehicle in forward motion. Although many proposals for various forms of device have been made in the literature, few of these appear to have been reduced to a sufficiently practical form to render them commercially practicable propositions, and only a few devices are commercially available. Of the commercially available devices, most of these are devices intended to be mounted on the roof of the driver's cab of the vehicle. Generally, however, cab roof-mounted devices are efficient only when the wind direction is from directly ahead of the vehicle, and they are less efficient as sidewinds come into effect. Moreover, a roof-mounting is not always convenient as it may require that the roof should be strengthened to withstand the forces to which the air-deflecting devices are subjected, and the roof-mounting may interfere with other auxiliary devices that need to be mounted on the cab roof.

U.S. Pat. No. 4,021,069 in the name A.S. Hersh discloses an aerodynamic drag-reducing device which is mounted directly on the front surface of the cargo-carrying compartment of the vehicle. This device, which is generally of a paraboloid shape, significantly reduces the aerodynamic drag not only when in the case of a head-on air stream, but also a significant reduction in drag is obtained with air streams impinging at various angles from the side. The effects of drag reduction with sidewinds is of considerable importance, since as will be appreciated, the air stream that is incident on the road vehicle as a result of the combination of the effects of forward motion and of the actual atmospheric wind conditions is normally yawed with respect to the head-on direction, and analysis has shown that even at road speeds of up to 55 mph, the angle of yaw of the resultant air stream will normally exceed 5° for at least about one-third of the time.

Although considerable savings in fuel consumption can be achieved by reducing aerodynamic drag, the efficiency of the device described in the above-mentioned Hersh U.S. Pat. No. 4,021,069 is not as great as may be desired.

SUMMARY OF THE INVENTION

It has now been found that an improved degree of aerodynamic drag reduction can be obtained using an air-deflecting shield which is mounted on the front of the cargo-carrying compartment of the road vehicle and which has a front surface contour which is in the form of a series of semi-ellipses extending in the horizontal plane, the ellipses having one axis extending longitudinally of the vehicle and the other axis extending transversely over the vehicle, and the longitudinal axis of successive ellipses diminishing toward the upper rear edge of the device, so that the vertical profile of the device conforms substantially to a segment of a further ellipse extending in the vertical median plane of the device.

One example of a preferred embodiment of a device according to the invention is illustrated in the accompanying drawings.

DESCRIPTION OF THE PREFERRED EMBODIMENTS

Figure 1:
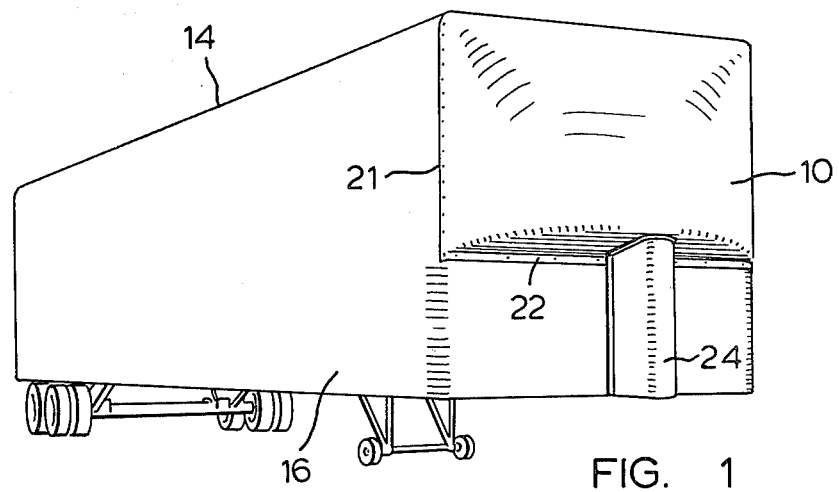
FIG. 1 is a perspective view of a propped trailer body equipped with an aerodynamic drag-reducing shield in accordance with the invention on its front surface.

The principles of construction of the air-deflecting shields of the present invention are adaptable for use with shields intended to be mounted on the truck boxes of straight truck bodies, where the truck box is mounted immediately behind and on the same chassis as the driver's cab, as well as on the front surfaces of trailers of tractor-trailer combinations, whether of the cab-over-engine type or of the more conventional type in which the engine is mounted forwardly of the driver's cab. The example illustrated in the accompanying drawings illustrates an air-deflecting shield intended for mounting on the front surface of a trailer of a tractor-trailer combination but with minor modifications, discussed in more detail later, the same advantageous air-deflecting form of profile may be employed for mounting on the front of a straight truck box.

Referring to the drawings in more detail, a shield 10 is illustrated which advantageously may be molded as a lightweight hollow shell from material having the required strength properties, e.g. of glass fibre material.

Figure 3:
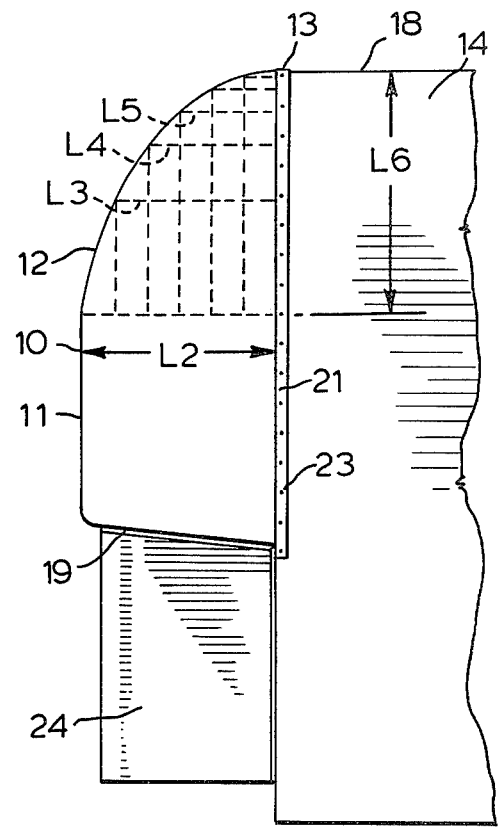
FIG. 3 is a side elevation thereof.

As is best seen in FIG. 3, the shell consists of a lower portion 11 which is of uniform horizontal cross-section and an upper portion 12 which, viewed in profile, progressively curves towards the upper rear edge 13 of the shield.

Thus, the lower section 11 of the shield has a front surface which is defined by a constant elliptical section $E_1$ having a major axis of length $L_1$ equal to the width of the trailer body 14 on which the shield is mounted, and having a minor semi-axis of length $L_2$, as shown in FIG. 3.

Figure 2:
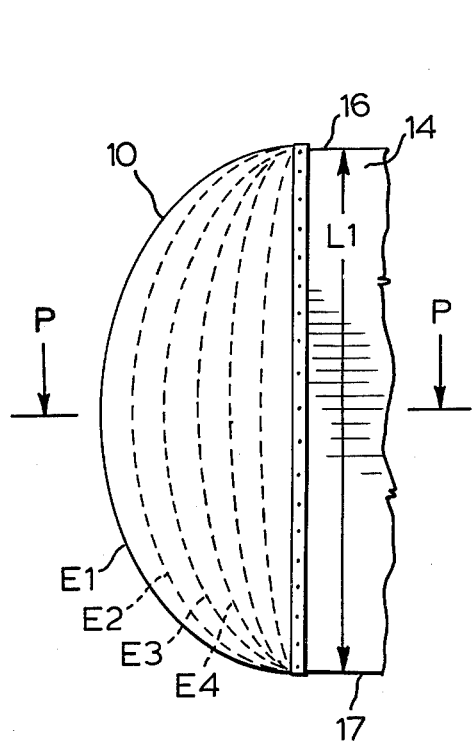
FIG. 2 shows a plan view of the shield.

In the upper section 12, the front surface is defined by a plurality of semi-ellipses $E_2$, $E_3$, $E_4$, etc. each of the same major axis length $L_1$, but of progressively decreasing minor semi-axis length, $L_3$, $L_4$, $L_5$, etc. as indicated in FIG. 3, the minor semi-axis length tending to zero towards the upper rear edge 13 of the shield. More specifically, the rate of decrease of the minor semi-axes $L_3$, $L_4$, $L_5$, etc. is arranged so that the side profile of the shield, as seen in FIG. 3, conforms substantially to a segment of a further ellipse lying in the vertical median plane P—P, as indicated in FIG. 2. Thus, the curvature of the front surface of the shield when viewed in profile, from the constant cross-section lower part 11 towards the upper rear edge 13, conforms to a part-elliptical surface.

In the embodiment illustrated, the curved vertical profile does not form a complete quadrant of an ellipse, and the profile illustrated is generated on the basis of an ellipse having a semi-axis somewhat greater than the dimension $L_2$. Merely by way of example, it can be mentioned that in the form illustrated, the vertical ellipse has a minor semi-axis of length about $1.042\,L_2$, and a major semi-axis of length equal to about $1.389 \times L_6$, wherein $L_6$ is the vertical distance between the upper end of the constant cross-section portion 11 and the upper edge 13 of the shield.

It will be appreciated that with the configuration described above, and as illustrated in the drawings, the flow of air that impinges on the front surfaces of the shield when the road vehicle is in motion will be directed along the contours of the elliptical surfaces, and this will apply not only to air deflected laterally outwardly towards the sides 16 and 17 of the trailer, but also to the airflow that is directed upwardly over the elliptical vertical profile towards the upper surface 18 of the trailer body.

Figure 4:
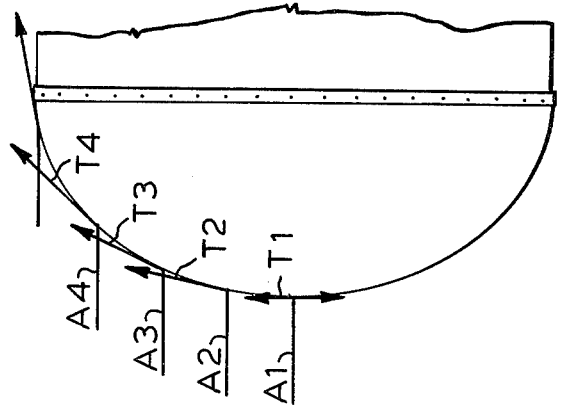
FIG. 4 is a plan view illustrating schematically the flow of air around the front surface of the shield device.

Although applicant does not wish to be limited to any particular theoretical explanation, it is considered that the significantly improved reductions in aerodynamic drag that are achievable with the above described contour may result upon the nature of the changes in the air-flow direction that occur when the air stream is directed around the elliptical surface. In this regard, reference should be made to FIG. 4, wherein are illustrated schematically air streams $A_1$, $A_2$, $A_3$, etc. impinging on the front surface of the shield 10, and wherein arrows $T_1$, $T_2$, $T_3$, illustrate tangents drawn to the elliptical surface at the point of impingement of the air stream, and representing the successive deflections which the air stream undergoes as it travels around the curved surface. As can be seen, near the centre of the shield, the air stream is deflected through a large angle of nearly 90° with respect to its original direction of travel, whereas adjacent the outer edges of the shield, the angle of deflection with respect to the original direction of travel is much less. Owing to the geometric properties of an ellipse, the angle of change of air stream direction decreases at an increasing rate as the air stream approaches the edge portions of the elliptical surfaces of the shield. It is considered that this reduction in the angle of change of the air stream permits the deflected air stream to join smoothly with the air stream flowing over the outer surfaces of the trailer body 14, and this avoids or reduces the tendency for turbulent flow and for the formation of the so-called "separation bubble" that are believed to be the main cause of aerodynamic drag.

It will be noted from the drawings that the lower surface of the lower section 11 is constituted by a smoothly downwardly sloping bottom wall 19. The wall 19 blends with the sidewalls of the lower portion 11 at smoothly rounded corners and edges. The rear edge of the shield is provided with a rearwardly directed lip 21 which fits snugly onto the top surface 18 and side surfaces 16 and 17 of the trailer body. The rear edge of the lower wall 19 has a downwardly directed lip 22 which merges smoothly with the lower surface 19, so that the contours of the shield 10 as a whole blend smoothly with the external surfaces of the trailer body 14. The shield 10 can be attached to the trailer body using attachment members e.g. screws or rivets 23 passed through the lips 21 and 22.

In the embodiment illustrated, the space below the shield 10 is separated by a vertically extending baffle member 24, which is aligned with the longitudinal median line of the trailer body 4 and the shield 10. The baffle member serves to trap a pocket of air on each side, creating areas of pressurized air which serve to deflect sidewinds and provide the effect of an aerodynamic shape in the lower portion of the space between the tractor and the trailer.

As mentioned above, the width $L_1$ of the shield, which constitutes the major axis of the ellipse defining the lower section 11 of the shield, is made to a width equal to the width of the trailer or, where the shield is to be applied to a straight truck, is made to the width of the truck box to which the shield is to be affixed. In the case of a tractor-trailer combination, the maximum extent of the minor semi-axis $L_2$ is determined by the space existing between the rear of the tractor and the front of the trailer. Subject to this limit, it is, however, preferred that the lower section 11 should project forwardly sufficiently to provide an elliptical shape with an appreciable forwardly extending rotundity. Thus, it is preferred that the ratio of the minor axis to the major axis in the section 11, i.e. the ratio $2L_2:L_1$ should be at least about 0.3, and more preferably in the range about 0.5 to about 0.7. As examples of suitable dimensions, it may be mentioned that with a width of trailer or truck box of about 96 inches, the minor axis may be about 60 inches, and the dimension $L_2$ about 30 inches, and with a trailer or truck box width of about 90 inches, a suitable minor axis length is about 56 inches, with the dimension $L_2$ being about 28 inches. In these examples, the ratio of the minor axis to the major axis $2L_2:L_1$, is about 0.625. When the shield is used in combination with straight trucks, the shield device is mounted on the front face of the truck box above the cab roof, and it is desirable that the device should not project forwardly beyond the front edge of the cab. With cabs of the usual dimensions, the above ratios of minor to major axis are employable.

The distance $L_6$, which is the distance below the trailer roof at which the rounded upper section 12 commences, is desirably at least about $0.25 \times L_2$, and is preferably at least about $0.5 \times L_2$, and more preferably is somewhat greater than $L_2$. Typically, where the dimension $L_2$ is about 28 or 30 inches, $L_6$ will be about 36 inches.

The vertical extent of the lower section 11 is preferably such that its lower edge, where it merges with the bottom surface 19, is a small distance below the cab roof in the case of a tractor-trailer combination. Where the shield device is applied on a truck box, the lower section 11 may be very short or non-existent, and the bottom of the shield device will extend just above the roof of the cab of the truck.

Figure 5:
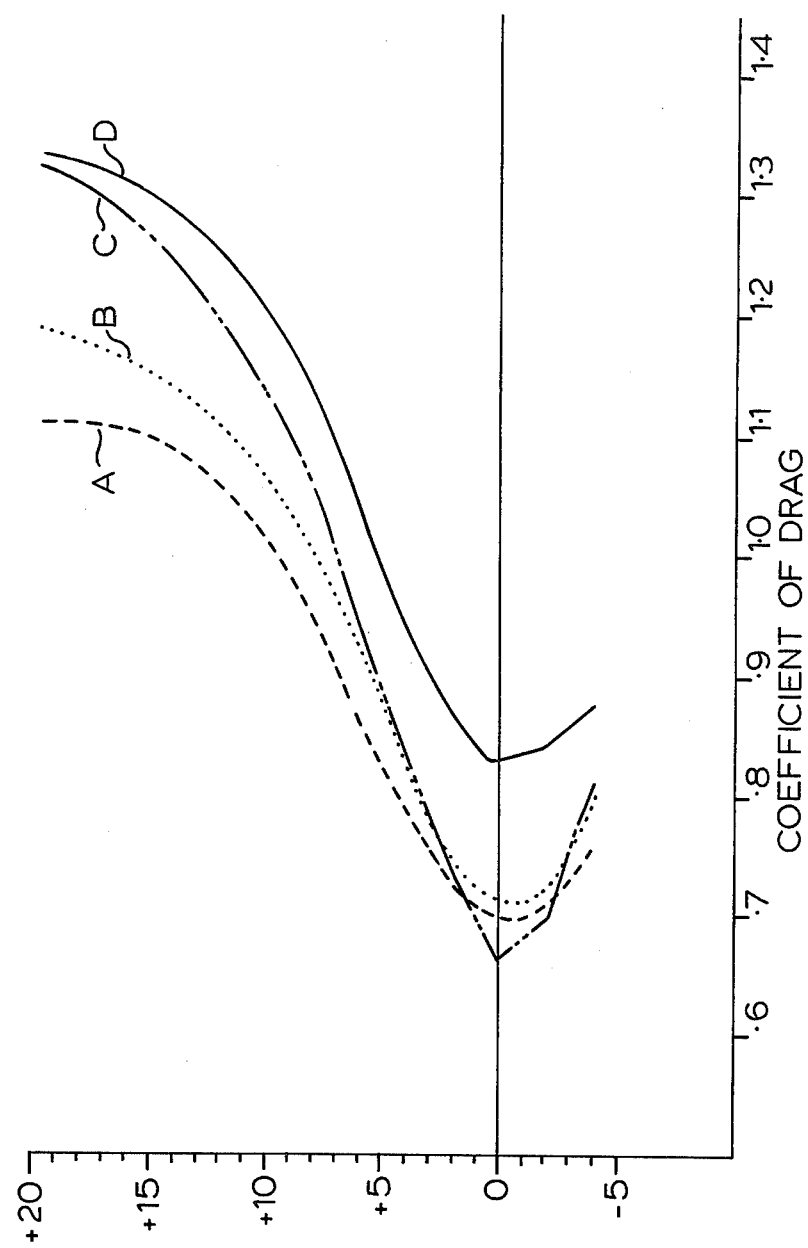
FIG. 5 is a graph plotting the coefficient of drag against the angle of yaw of the incident air stream for various drag-reducing devices.

FIG. 5 illustrates data obtained from wind-tunnel tests of the reduction of drag obtained with examples of shields constructed in accordance with the principles of the invention and with a known form of cab roof-mounted device.

The tests were conducted on 1/10th scale models in accordance with the procedure described in more detail in the National Research Council of Canada publication "A Wind Tunnel Investigation into the Fuel Savings Available From the Aerodynamic Drag Reduction of Trucks", K.R. Cooper, National Aeronautical Establishment, Ottawa, October 1976. The coefficient of drag $C_D$ was obtained at varying air stream yaw angles between $-5°$ and $+20°$ in accordance with the procedure described in the above-mentioned publication. The tests were conducted using a scale model of a tractor-trailer combination, using a scale model of a White Freightliner trailer, with a tractor-trailer separation of 53 inches.

Curve A illustrates results obtained with a shield according to the invention as illustrated in the accompanying drawings, and having a dimension $L_2$ of 36 inches and provided with a vertically extending baffle 24. Curve B illustrates the results obtained with a shield in accordance with the invention, but without a baffle member, and with a dimension $L_2$ of 30 inches. Curve C shows the results obtained with a cab roof-mounted type of air deflector, and curve D shows the results obtained with the unmodified tractor-trailer combination, without any drag-reducing device.

It may be noted from the graph that at larger angles of yaw, curve C tends to approach curve D, illustrating that the reduction in the drag coefficient $C_D$ tends to diminish as the angle of yaw increases. In contrast, it will be noted that with the devices of curves A and B, there is a somewhat greater reduction of the drag coefficient at larger angles of yaw.

From these results, the wind-averaged drag coefficient achieved with the various devices was calculated, in accordance with the procedures described in the above-mentioned National Research Council publication. The wind-averaged drag coefficient is a weighted average of the drag coefficients of air streams at various angles of yaw, taking into account the relative probabilities of the resultant air stream being incident at given angles of yaw on a truck travelling at 55 mph.

It was found that the wind-averaged drag coefficient $C_D$ achieved with the device of curve A was 0.16 units less than the $C_D$ value obtained from curve D (no drag-reducing device). With curve B, the corresponding reduction in the drag coefficient is 0.12 and with curve C, the reduction is 0.12. In comparison, as described in the above-mentioned National Research Council publication, a reduction in the drag coefficient of 0.11 is obtained with the Nosecone (trademark) type of trailer-mounted device that is described and illustrated in the Hersh U.S. Pat. No. 4,021,069.

I claim:

1. An aerodynamic drag-reducing shield for mounting on the front of a cargo-carrying compartment of a road vehicle, the shield having a substantially rectangular rear edge adapted to conform to a substantially rectangular front face of said compartment, and a rigid, smoothly curved front surface of which all horizontal sections conform to a semi-ellipse having its minor axis extending longitudinally of the vehicle and its major axis transversely, each of said sections having the same transverse width, the shield having an upper portion curving smoothly rearwardly to the upper rear edge of the shield and having a vertical cross-section that conforms substantially to a segment of a further ellipse having its major axis extending in the vertical median plane of the shield, and a minor axis extending horizontally in said median plane; and a lower portion of the same width as said upper portion and being of uniform horizontal semi-elliptical cross-section.

2. A shield as claimed in claim 1 wherein the shield has a planar lower surface blending smoothly at rounded edge portions with the semi-elliptical front surface of the shield.

3. A shield as claimed in claim 2 wherein said planar surface slopes downwardly from the front to the rear of the shield.

4. A shield as claimed in claim 2 including a baffle extending in the vertical median plane of the shield below said planar surface.

5. A shield as claimed in claim 1 wherein the front surface conforms with a semi-ellipse over substantially the whole of its width, and terminates in rearwardly directed edge portions for conforming with the top and sides of the cargo compartment.

6. In combination, a road vehicle having a cargo carrying compartment and a shield as claimed in claim 1 mounted thereon, wherein said uniform cross-section conforms to the semi-ellipse of an ellipse that has a transversely extending major axis equal to the width of the compartment, and a longitudinally-extending minor axis, the ratio of the minor axis to the major axis being at least about 0.3.

7. The combination of claim 6 wherein said ratio is from about 0.5 to about 0.7.

8. The combination of claim 6 wherein said ratio is about 0.625.

* * * * *